United States Patent [19]

Marshall et al.

[11] Patent Number: 5,528,125
[45] Date of Patent: Jun. 18, 1996

[54] BUCK-BOOST SWITCH MODE POWER SUPPLY WITH BURST TOPOLOGY

[75] Inventors: Andrew Marshall; Thomas A. Schmidt, both of Dallas, Tex.

[73] Assignee: Texas Instruments Incorporated, Dallas, Tex.

[21] Appl. No.: 416,663

[22] Filed: Apr. 5, 1995

[51] Int. Cl.[6] ................................ G05F 1/10; G05F 1/40
[52] U.S. Cl. .................................... 323/222; 323/282
[58] Field of Search ................................ 323/222, 223, 323/268, 271, 282, 283, 284, 285; 363/22, 23, 24, 25, 133, 134

[56] References Cited

U.S. PATENT DOCUMENTS

| | | | |
|---|---|---|---|
| 4,395,675 | 6/1983 | Toumani | 323/282 |
| 4,578,630 | 3/1986 | Grosch | 323/271 |
| 4,736,151 | 4/1988 | Dishner | 323/222 |
| 4,801,859 | 1/1989 | Dishner | 323/222 |
| 5,402,060 | 3/1995 | Erisman | 323/268 |
| 5,426,578 | 6/1995 | Nakamura et al. | 363/37 |

*Primary Examiner*—Matthew V. Nguyen
*Attorney, Agent, or Firm*—Robby T. Holland; W. J. Brady; Richard L. Donaldson

[57] ABSTRACT

A buck-boost switch mode regulated power supply using a burst circuit topology includes a detection circuit to sense overcurrent in the high side connected power transistor. This causes the flip flop to flip which turns off the transistor. A comparator connected to the output voltage detects when the output voltage falls below the threshold value of the comparator and sends a signal to the flip flop which is reset upon the next pulse of a pulsed reset signal. When the flip flop is reset, the high side power transistor is turned back on.

3 Claims, 7 Drawing Sheets

BUCK-BOOST SWITCH MODE POWER SUPPLY WITH BURST TOPOLOGY

FIELD OF INVENTION

The invention relates generally to electrical power supplies and more particularly to switch more regulated power supplies.

BACKGROUND OF INVENTION

Regulated power supplies provide a stable output voltage. Many applications exist for regulated power supplies. Personal computers and printers provide two exemplary examples. One such regulated power supply is commonly known as the buck-boost switch mode regulator as shown in prior art FIG. 1 which generates a stable output voltage from a supply voltage that may be lower or higher than the output voltage being regulated. This is traditionally accomplished using conventional switch mode regulation techniques which require an error amplifier and ramp generator.

In the buck-boost switch mode regulator of prior art FIG. 1, an error amplifier 1 compares the output voltage against an internal reference voltage VREF. An on chip ramp generator provides a ramp signal that typically may between 0 to 3 volts to an input of a comparator 2. Adjustment of the switching threshold of the error amplifier is accomplished with R1 and R2. A compensation resistor R and capacitors C and C2 define the time constant of the error amplifier. A connection pin typically exists for making external connection to the error amplifier. Capacitor C is usually located off chip due to its relatively large size of (typically several thousand picofarads). Locating resistor R off chip also aids in keeping its resistance constant over temperature changes. Resistor R typically has a value of 2 to 3 Kohms. Capacitor C2 is usually small enough so that is located on chip. Transistors Q1 and Q2 are power transistors and may be of the lateral drain metal oxide semiconductor (LDMOS) type. They are typically located off chip although they may be on chip. Transistor Q1 is the high side switching transistor and transistor Q2 is the low side switching transistor. Schottky diodes S1 and S2, storage capacitor C1, and resistors R1 and R2 are typically off chip.

Buck regulators (where the supply voltage must always be higher than the output voltage) are available in both conventional configurations as shown in prior art FIG. 2 and in burst mode configuration as shown in prior art. FIG. 3. The conventional way to detect switching thresholds for the burst type buck regulator is to detect the output voltage rising and turn off the switching transistor Q1 once the threshold has been reached. FIG. 3 accomplishes this by adding flip flop 3 which is reset by a periodic reset pulse having the same frequency as the ramp generator of FIGS. 1 and 2. The switching transistor Q1 is switched back on, following a periodic reset pulse from a pulse generator, providing that the output voltage has fallen below the output voltage threshold. A voltage divider (formed by feed-forward capacitor C3, resistors R1 and R2) reduces the output voltage so that it may be compared to the level of VREF. The feed-forward capacitor C3 provides a low impedance path for any transient fast moving signals and may or may not be provided in the burst design.

While the burst type topology of prior art FIG. 3 is simpler to implement than the buck type topology of prior art FIG. 2 as it has only a comparator, no error amplifier and no ramp generator circuitry, it has the drawback of providing a larger output ripple voltage. However, unlike the buck-boost topology of prior art FIG. 1, the burst type topology of prior art FIG. 3 is unable to be utilized in directing a burst type buck-boost (where the input voltage may be smaller than the required output voltage) which may be particularly useful in printer applications, for example. What is needed, therefore, is a regulated power supply having the advantages of both the buck-boost topology and the burst topology.

It is accordingly an object of the invention to provide a regulated power supply having both buck-boost and burst characteristics.

Other objects and advantages of the invention will be apparent to those of ordinary skill in the art having the benefit of the specification and drawings herein.

SUMMARY OF THE INVENTION

A regulated power supply of the buck-boost type having burst topology includes a detection circuit to sense the charging current and to disable the switching transistors

DETAILED DESCRIPTION OF PREFERRED EMBODIMENT

Figure 1:
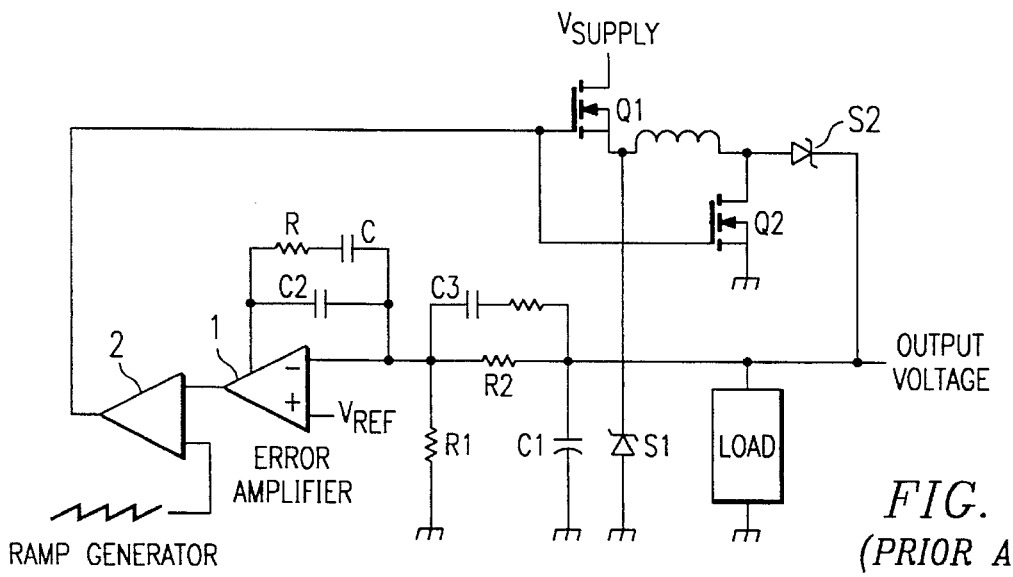
FIG. 1 is a prior art drawing of a buck-boost switch mode regulator.
Figure 2:
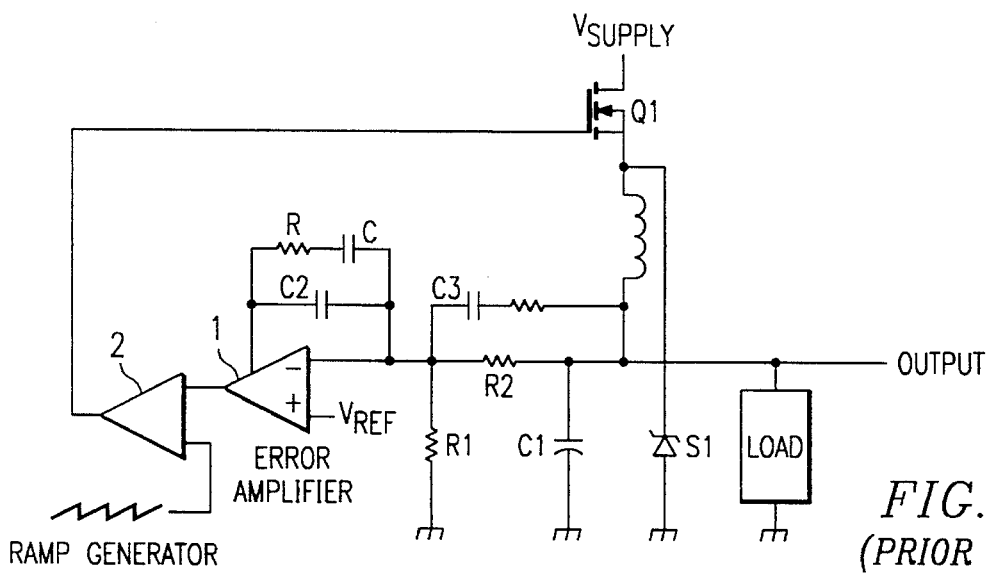
FIG. 2 is a prior art drawing of a buck type switch mode regulator.
Figure 3:
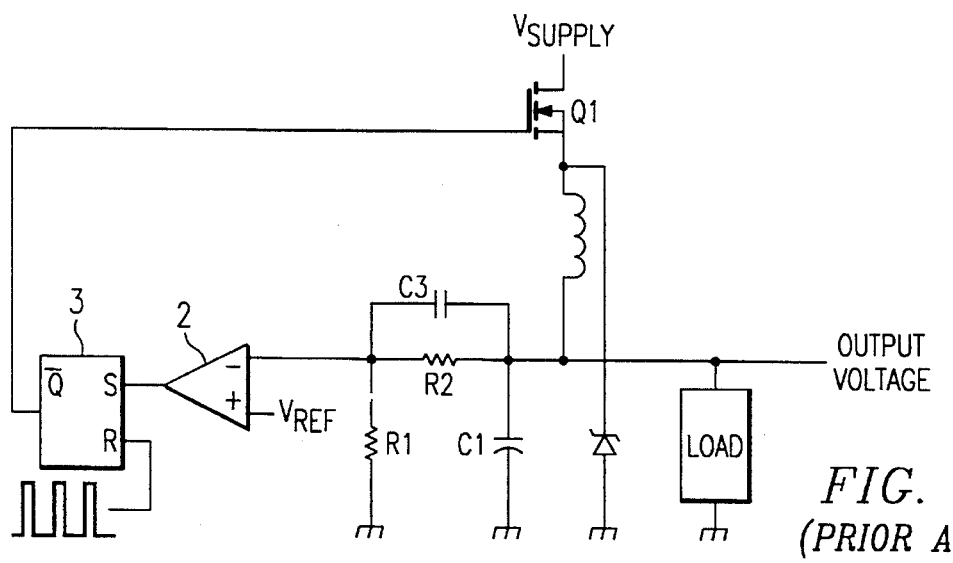
FIG. 3 is a prior art drawing of a burst-buck switch mode regulator.
Figure 4:
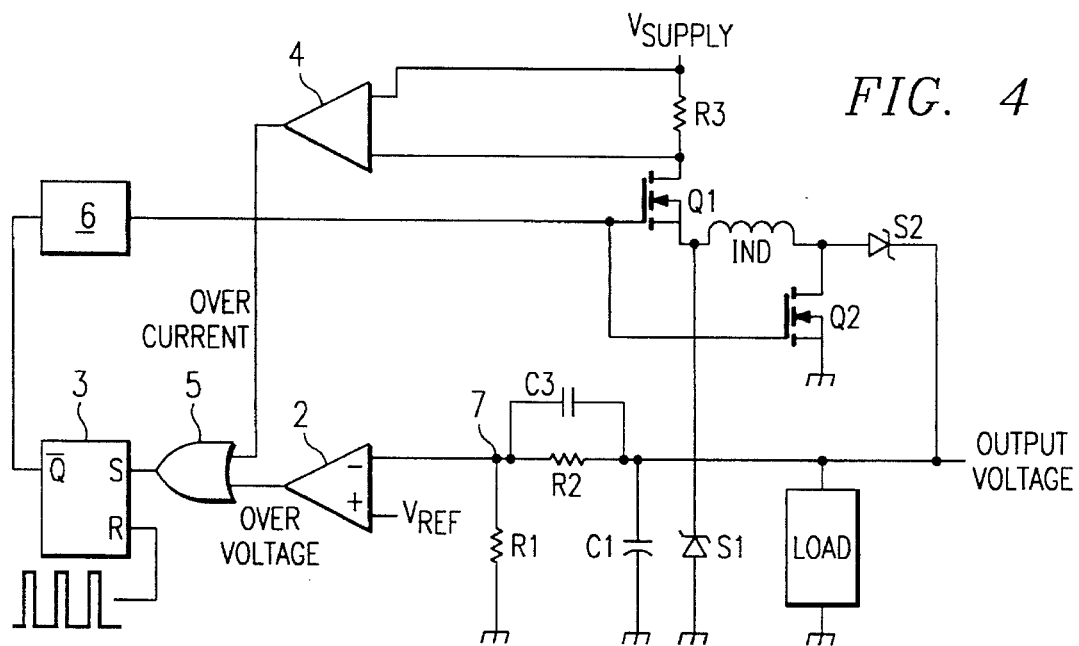
FIG. 4 is a drawing illustrating a preferred embodiment of the invention, a buck-boost switch mode power supply using burst topology.

FIG. 4 is a drawing illustrating a preferred embodiment of a buck-boost switch mode power supply using burst topology while FIGS. 9A–9D are electrical schematic diagrams of FIG. 4. For ease of explanation, some reference numerals in FIG. 4 correspond to those of FIGS. 1–3. While many applications exist for the invention herein, the following description relates to using the power supply to drive motors in a printer where the input voltage Vsupply could drop below the value of the output voltage because of impedance of the transformer used in the printer.

In FIG. 4, the internal reference voltage VREF is chosen to be 5 volts and the output voltage is chosen to be 15 volts. The resistor divider includes resistor R1 having a value of about 1000 ohms and resistor R2 having a value of about 2000 ohms. Storage capacitor C1 has a value of about 500 microfarads to stabilize the voltage output. Schottky diode S1 connects to the node between the source of high side switching transistor Q1 and inductor IND. A resistor R3 is provided between the voltage supply and high side switching transistor Q1. A comparator 4 connects across resistor R3. Resistor R3 is a fairly small resistor having values between about 0.1 to 2 ohms. The value depends upon the threshold switching voltage of comparator 4. However, it shouldn't be too high because during the time current is being provided through resistor R3, as explained in the method of operation below, a power loss exists. Typical threshold values for comparator 4 are between the range 0.1 to 2 volts with 1.25 volts being exemplary for the output voltage chosen. The output of an OR logic gate 5 connects to the set input of flip flop 3. One input to OR gate 5 is the output of comparator 2. The other input of OR gate 5 is the output of comparator 4.

FIG. 4 advantageously removes the external chip compensation (resistor R, and capacitors C and C2 of FIGS. 1 and 2) from the buck-boost topology and simplifies the internal operating circuitry by removing the need for the ramp generator. In its method of operation, the circuit of FIG. 4 advantageously allows buck-boost switch mode operation without the complexity of conventional switch-mode regulator compensation and ramp generation. As explained below, it uses a current limit scheme, coupled with voltage level control, to implement buck-boost operation in the burst topology.

In operation, assume that a reset pulse has caused flip flop 3 to reset such that transistors Q1 and Q2 are on. Current starts flowing through resistor R3, transistor Q1, the inductor IND and then through transistor Q2 to ground. The inductor IND begins to charge up. At some point the current through the inductor reaches a predetermined value referred to as the current sense value or the current limit value. Comparator 4 switches which causes flip flop 3 to turn off transistors Q1 and Q2. The current in inductor IND wants to continue recirculating and recirculates through Schottky S1 and Schottky S2. This has the effect of charging up the output voltage. If the power supply was providing about the correct output voltage, this causes the output voltage to increase by a small amount (about 0.3 volts, for example,) fairly instantaneously due mostly to series resistance in the capacitor C1. The inductor continues to discharge which causes the storage capacitor C1 to charge. It also supplies current to drive the load. Once the inductor current has reduced sufficiently, the inductor is not providing enough current to drive the load. Load current is then pulled from capacitor C1 which discharges capacitor C1 slowly. As soon as resistor diveded output voltage (node 7) falls to less than the threshold voltage of comparator 2, comparator 2 is releassed and then the next reset pulse causes flip flop 3 to flip which turns Q1 and Q2 back on where the cycle is repeated. The inductor again begins to be charged. As soon as the inductor is charged up to the correct current, comparator 4 switches on. The circuit is possibly a self sustaining circuit without pulse requirements once it is started up and running. The pulse ensures a minimum cycle (about 5 microseconds in this embodiment) exists.

In FIG. 4, the predetermined current value is derived by the threshold voltage of comparator 4, divided by the resistance R3. In this embodiment, it has a value of about 5.5 amps.

Figure 5:
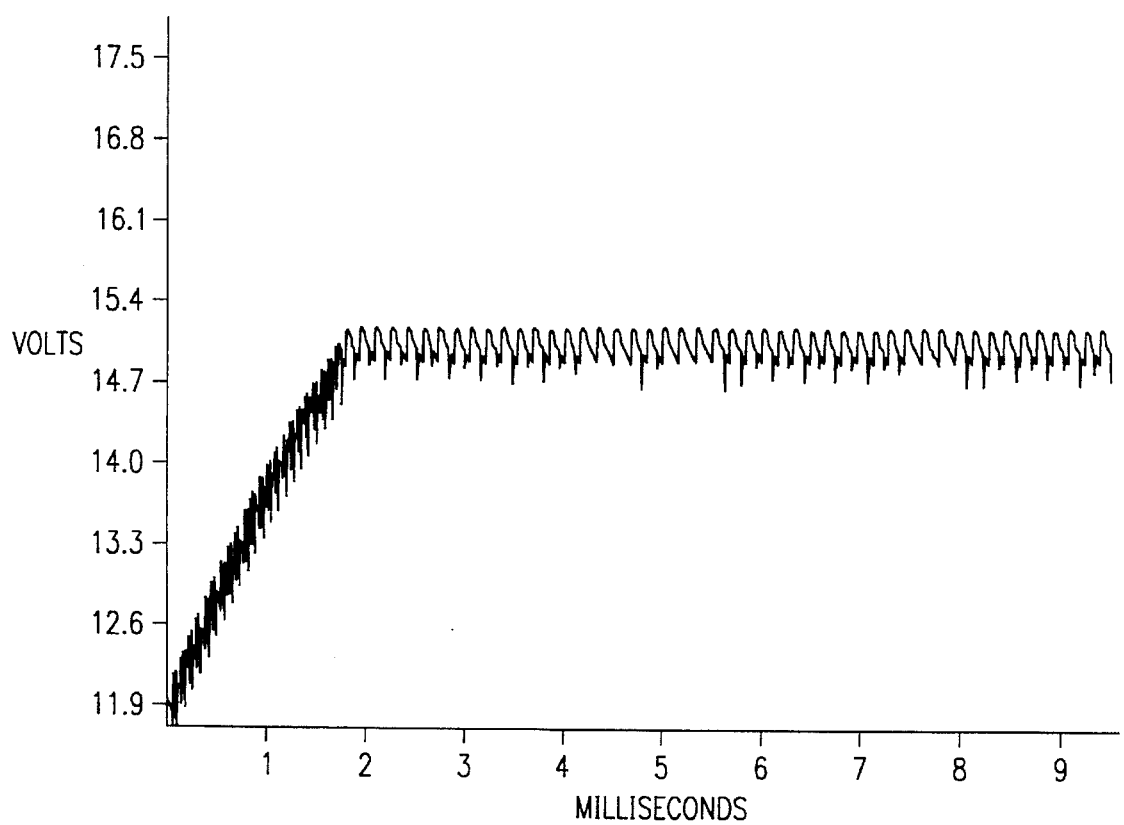
FIG. 5 is a waveform of the output voltage of FIG. 4 with an input voltage of 30 volts.
Figure 6:
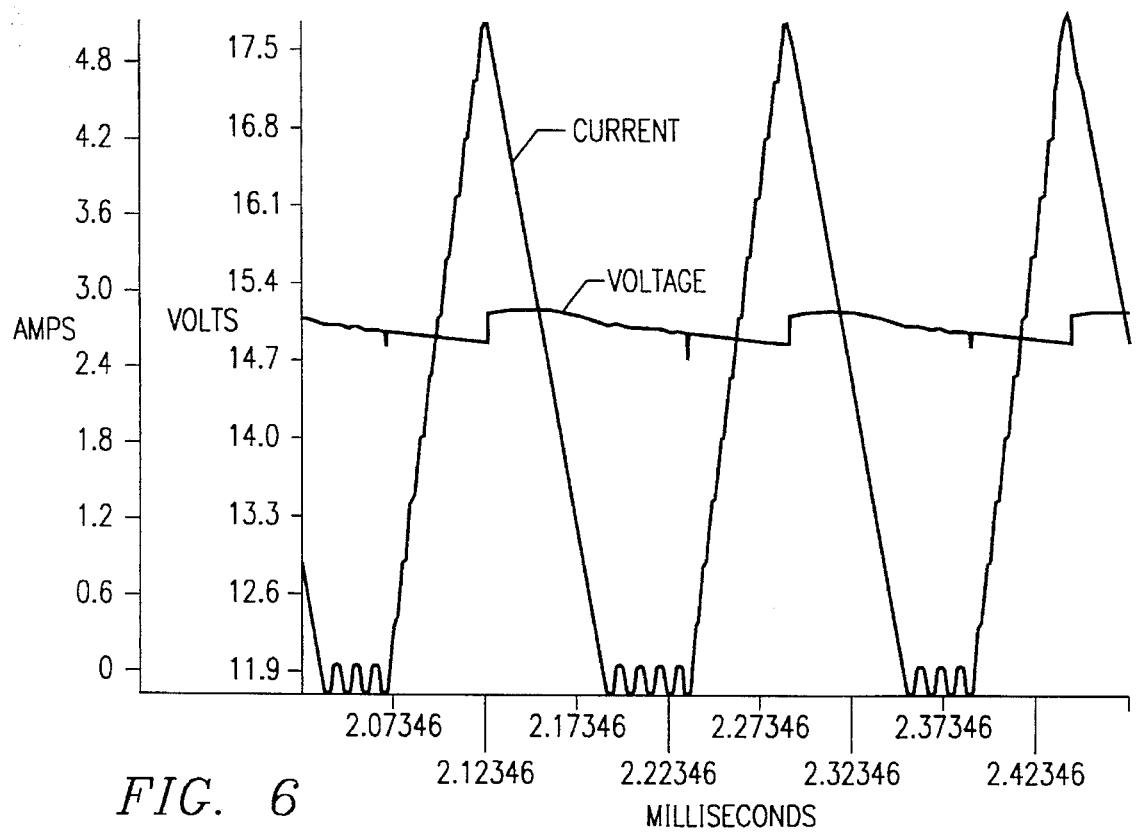
FIG. 6 is a waveform of current and output voltage of FIG. 4 with an input voltage of 30 volts.
Figure 7:
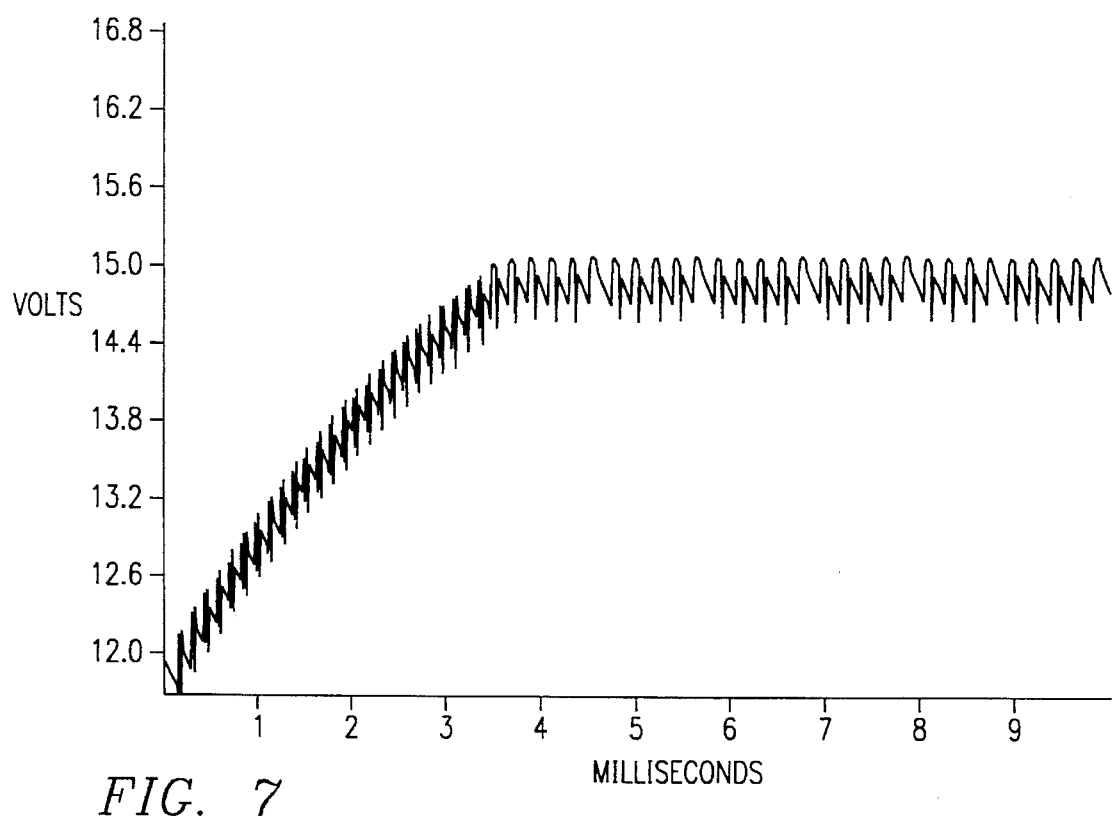
FIG. 7 is a waveform of the output voltage of FIG. 4 with an input voltage of 15 volts.
Figure 8:
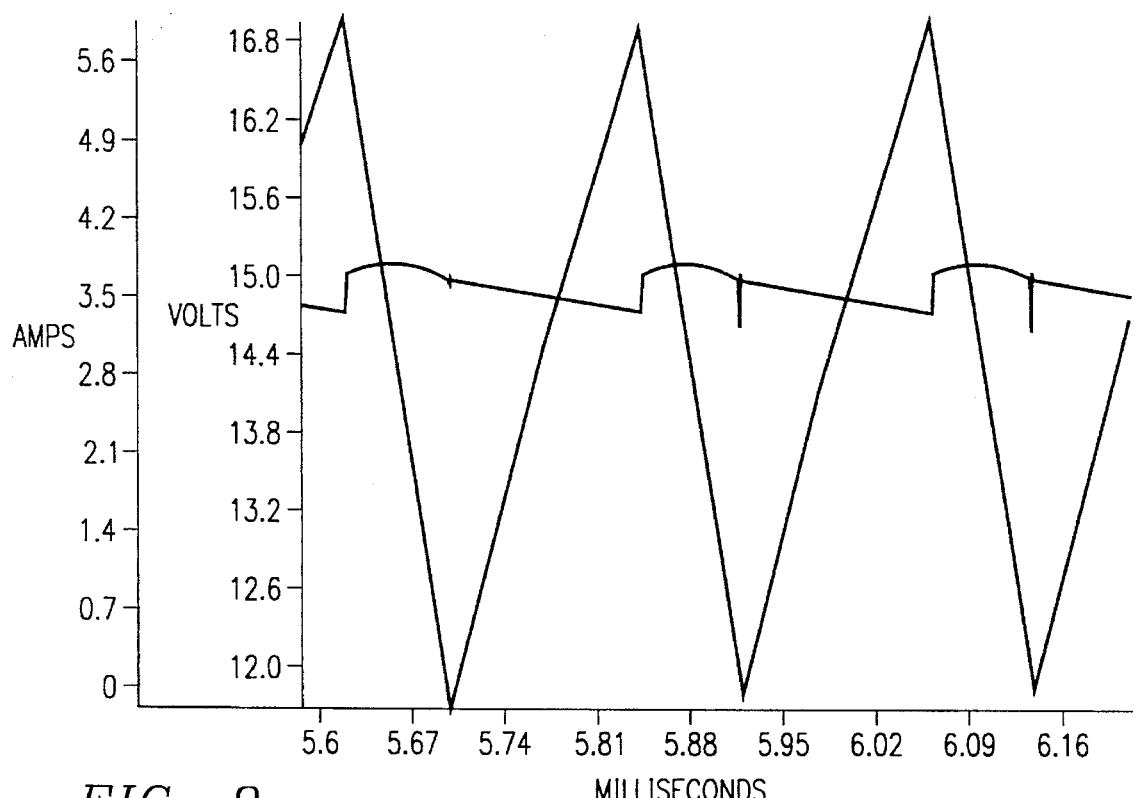
FIG. 8 is a waveform of current and output voltage of FIG. 4 with an input voltage of 15 volts.

FIGS. 5–8 provide simulated waveform diagrams of the operation of FIG. 4. In FIGS. 5 and 6, the input voltage is 30 volts to get an output voltage of nominally 15 volts. In FIGS. 7 and 8, the input voltage is 10 volts to get an output voltage of nominally 15 volts. Hence, the output voltage is maintained over a wide range of input voltages. In FIGS. 6 and 8, the current shown is the current through resistor R3.

Figure 9D:
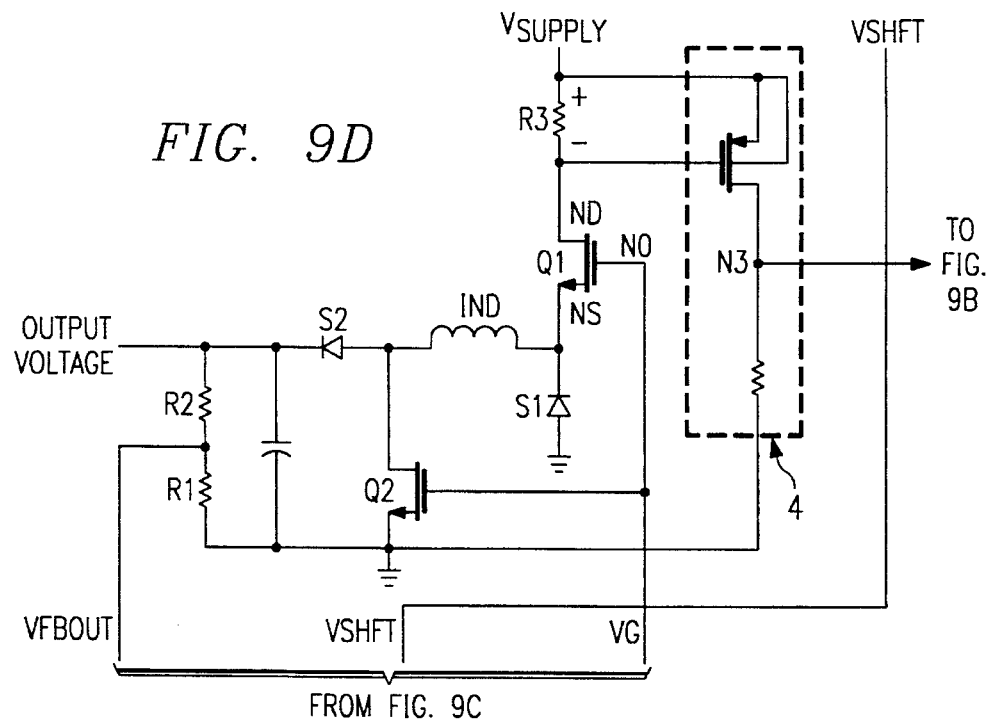
FIGS. 9A–9D are electrical schematic diagrams of the preferred embodiment of FIG. 4.
Figure 9A:
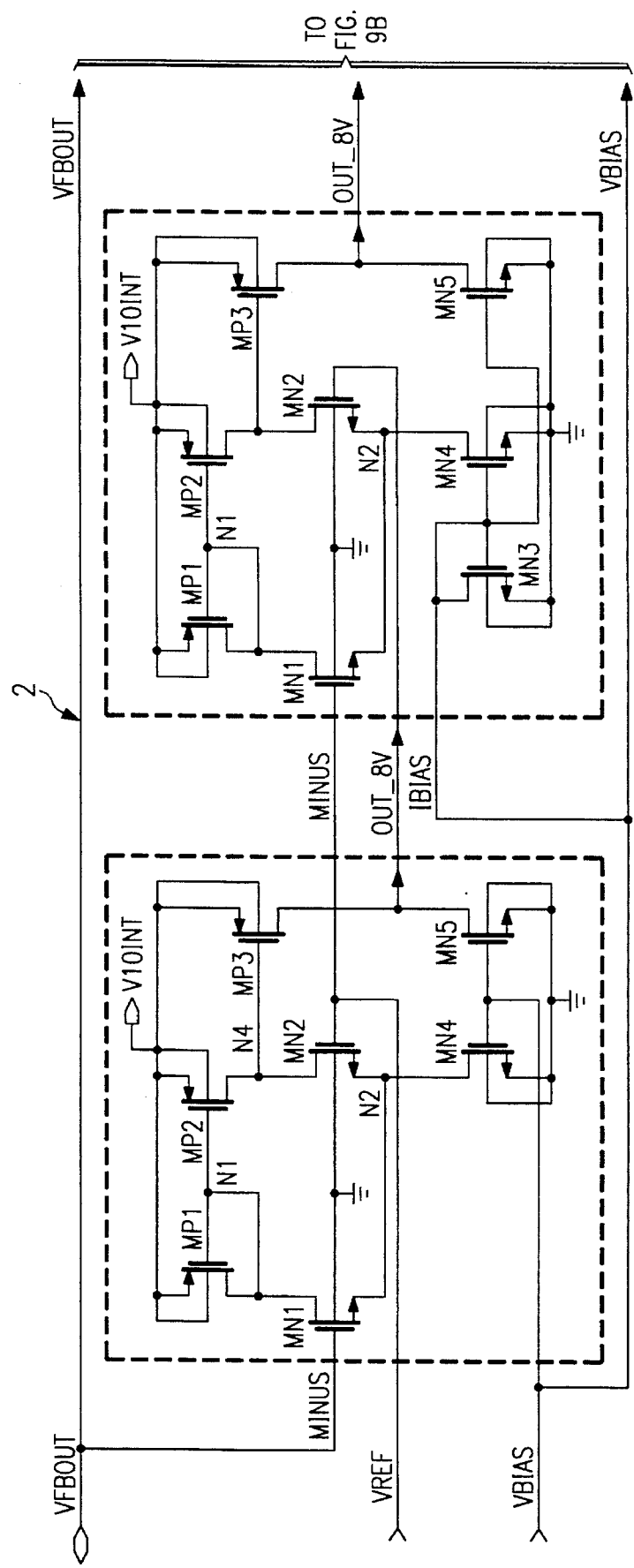
Figure 9B:
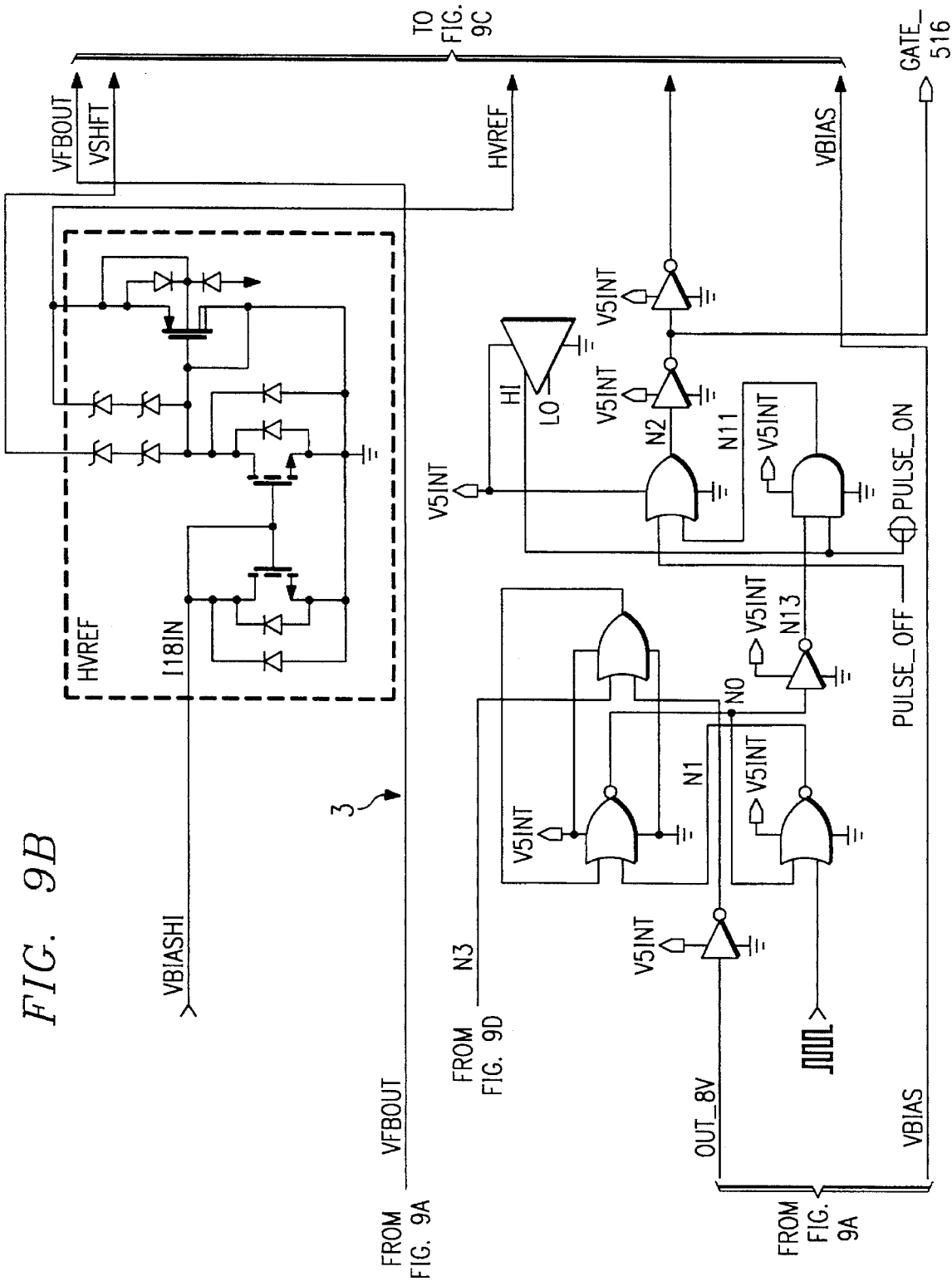
Figure 9C:
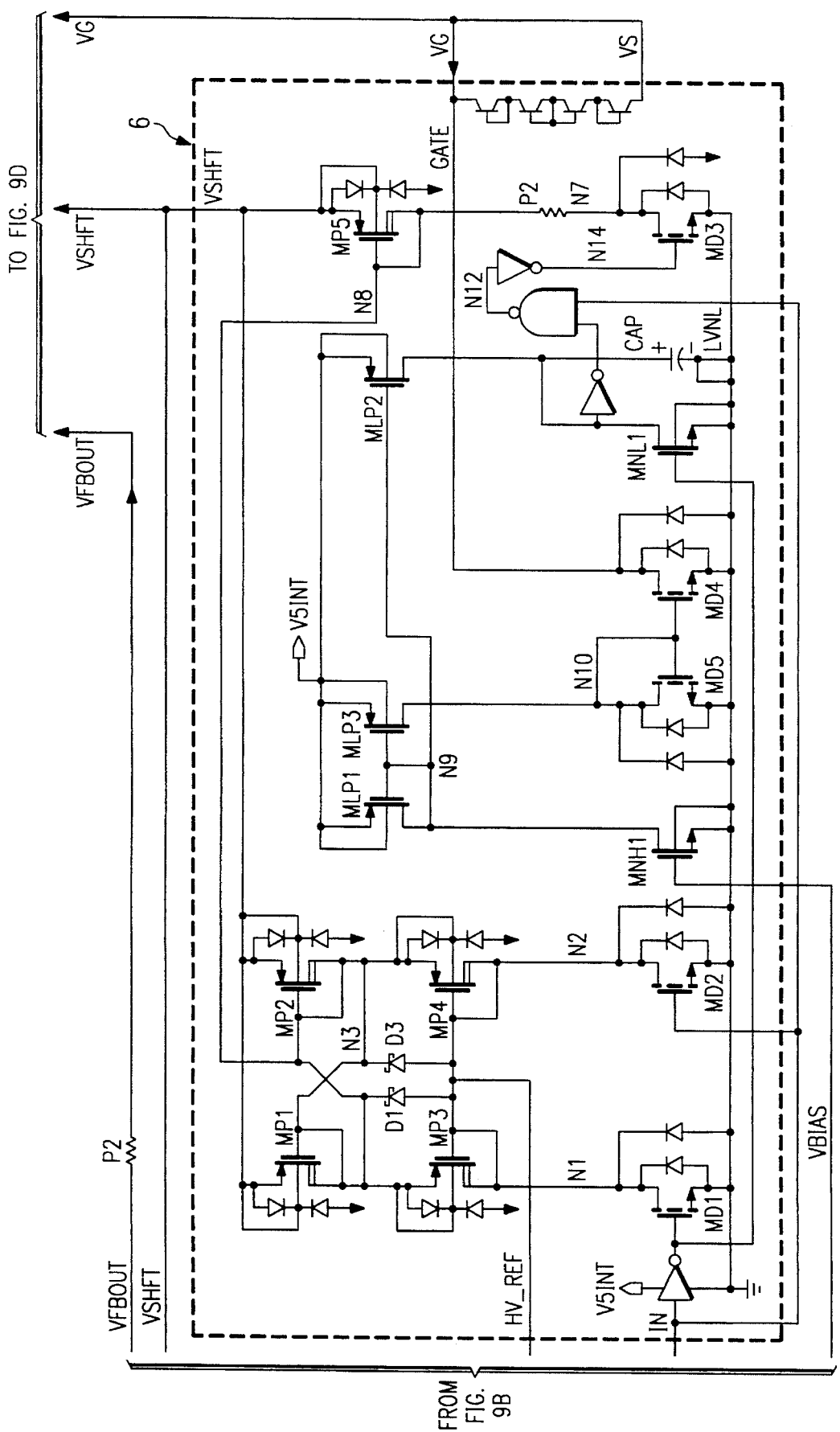

FIGS. 9A–9D are electrical schematic diagrams of the devices of FIG. 4. Comparator 2 is illustrated in FIG. 9A. It consist of two comparators ganged together. Flip flop 3 is illustrated in FIG. 9B along with some nonutilized circuitry. Level shifter 6 is illustrated in FIG. 9C. Level shifter 6 ramps the 5 volt output of flip flop 3 up to about 30 volts. FIG. 9D illustrates the remaining devices.

While the invention has been described with reference to illustrative embodiments, this description is not intended to be construed in a limiting sense. Various other embodiments will be apparent to persons skilled in the art upon reference to this description. For example, while the gates of transistors Q1 and Q2 are shown being connected together, a designer may wish to drive them slightly different if he wishes to drive different voltages. Additionally, an enhancement of the basic circuit incorporates a forced switching transistor off time of about 1 microsecond immediately before the reset pulse. This has the effect of providing some charge to the output capacitor during inductor charging section of the cycle, which reduces the output voltage ripple slightly. A further advantage is that by removing transistor Q2 and Shottky S2 (shorting inductor IND) to output voltage) the circuit becomes a conventional buck regulator. It is therefore contemplated that the appended claims will cover any such modifications of the embodiments as fall within the true scope and spirit of the invention.

What is claimed is:

1. A buck-boost burst power supply with burst comprising:
    a first power transistor coupled through an inductor to a load in high side configuration to provide an output voltage;
    a second power transistor coupled through the inductor to the load in low side configuration to provide the output voltage;
    a first means for detecting current level through the first power transistor;
    a second means for turning the first power transistor "off" in response to the first means for detecting;
    a comparator coupled to the output voltage;
    a flip flop coupled to the output of the comparator and connected to a pulsed reset signal to turn the first power transistor "on" once the output voltage falls below a threshold voltage of the comparator; and
    a voltage feedback control system comprising at least: a) said second means for turning the first power transistor "off"; b) said comparator; and c) said flip flop, said feedback control system being selectively operable to maintain said output voltage within prescribed limits through selective activation and deactivation of said first and second power transistors.

2. The buck-boost burst power supply of claim 1 wherein the first means for detecting comprises a resistor coupled between a supply voltage and the first power transistor.

3. A buck-boost burst power supply with burst comprising:
    a first power transistor coupled through an inductor to a load in high side configuration to provide an output voltage;
    a second power transistor coupled through the inductor to the load in low side configuration to provide the output voltage;
    a first means for detecting the current level through the first power transistor, said first means for detecting comprising a resistor coupled between a supply voltage and the first power transistor;

a second means for turning the first power transistor off in response to the first means for detecting, said second means for turning the first power transistor off comprising logic circuitry connected across the resistor, connected to the output of the comparator and connected to the flip flop;

a comparator coupled to the output voltage; and a flip flop coupled to the output of the comparator and connected to a pulsed reset signal to turn the first power transistor on once the output voltage falls below the threshold voltage of the comparator.

* * * * *